US012214859B1

(12) United States Patent
Diaz et al.

(10) Patent No.: US 12,214,859 B1
(45) Date of Patent: *Feb. 4, 2025

(54) ELECTRICALLY OPERATED WINDOW SHADE ASSEMBLY FOR AN AIRCRAFT WINDOW HAVING OPAQUE AND TRANSLUCENT SHADES

(71) Applicant: AEROSPACE TECHNOLOGIES GROUP, INC., Boca Raton, FL (US)

(72) Inventors: Francisco Diaz, Lake Worth, FL (US); Anwar Riyad Khalid, Atlanta, GA (US); Josef Menashe, Boca Raton, FL (US); Mario Ceste, Boca Raton, FL (US); Pooneh Roozbeh Javan, Boca Raton, FL (US); Carolyn Engert, Boynton Beach, FL (US)

(73) Assignee: AEROSPACE TECHNOLOGIES GROUP, INC., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,102

(22) Filed: Jun. 11, 2024

Related U.S. Application Data

(63) Continuation of application No. 18/125,337, filed on Mar. 23, 2023, now Pat. No. 12,017,749.

(60) Provisional application No. 63/322,866, filed on Mar. 23, 2022, provisional application No. 63/395,392, filed on Aug. 5, 2022.

(51) Int. Cl.
*B64C 1/14* (2006.01)

(52) U.S. Cl.
CPC ............................... *B64C 1/1492* (2013.01)

(58) Field of Classification Search
CPC ............................ B64C 1/1492; B64C 1/1484
See application file for complete search history.

(56) References Cited

U.S. PATENT DOCUMENTS

| 3,906,669 A | 9/1975 | Vorguitch |
| 4,364,533 A | 12/1982 | Pompei et al. |
| 4,998,576 A | 3/1991 | Moreno |
| 5,515,898 A | 5/1996 | Alcocer |
| 6,186,211 B1 | 2/2001 | Knowles |
| 6,832,641 B1 | 12/2004 | Sanz et al. |
| 7,690,414 B2 | 4/2010 | Knowles |
| 8,157,214 B2 | 4/2012 | Schwarz et al. |
| 8,726,968 B2 | 5/2014 | Sievers et al. |

(Continued)

FOREIGN PATENT DOCUMENTS

| EP | 2236729 | 10/2010 |

OTHER PUBLICATIONS

International Search Report and Written Opinion for PCT/US23/16137, Authorized Officer Kari Rodriguez, Receiving Office United States Patent and Trademark Office, Mailing date Jun. 15, 2023.

*Primary Examiner* — Christopher D Hutchens
(74) *Attorney, Agent, or Firm* — The Concept Law Group, PA; Scott D. Smiley; Scott M. Garrett

(57) ABSTRACT

An electrically operated window shade system includes a frame that is mounted on the outer side of the inner wall of an aircraft cabin. A cassette is mounted in the frame and includes one or more motors and drive systems and one or two shade elements that are moved between raised and lowered positions under electric control. A user can operate the electric controls to adjust the amount of light coming through the window, as desired.

20 Claims, 11 Drawing Sheets

(56) References Cited

U.S. PATENT DOCUMENTS

| | | |
|---|---|---|
| 12,017,749 B2 * | 6/2024 | Diaz .................... B64C 1/1492 |
| 2003/0015624 A1 | 1/2003 | Sanz et al. |
| 2008/0099615 A1 | 5/2008 | Steiner et al. |
| 2008/0148638 A1 | 6/2008 | Knowles |
| 2010/0126676 A1 | 5/2010 | Tischer et al. |
| 2012/0273143 A1 | 11/2012 | Fillmore et al. |
| 2014/0048219 A1 | 2/2014 | Knowles |

* cited by examiner

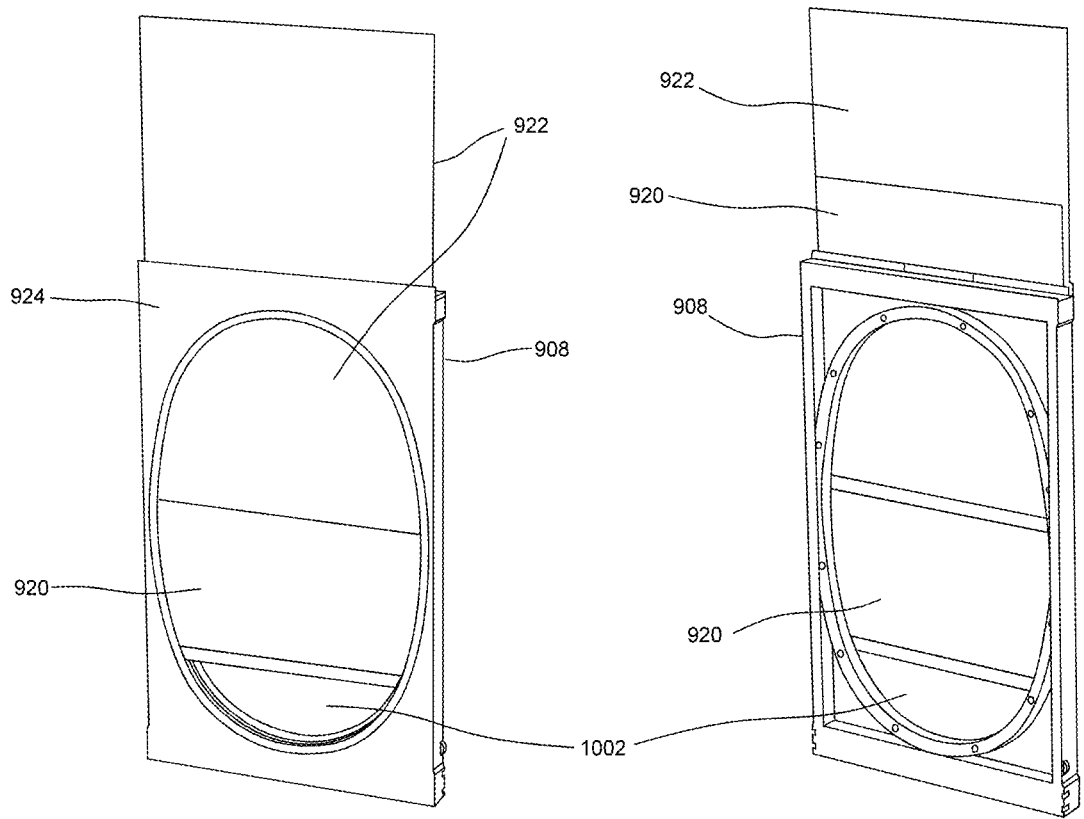
FIG.10A                               FIG.10B

ELECTRICALLY OPERATED WINDOW SHADE ASSEMBLY FOR AN AIRCRAFT WINDOW HAVING OPAQUE AND TRANSLUCENT SHADES

CROSS REFERENCE

This application is a continuation of U.S. patent application Ser. No. 18/125,337, filed Mar. 23, 2023, and through that application claims the benefit of U.S. provisional application No. 63/322,866, filed Mar. 23, 2022, and U.S. provisional application No. 63/395,392, filed Aug. 5, 2022, the entireties of each of which are hereby incorporated by reference.

FIELD OF THE INVENTION

The present invention relates generally to window shade assemblies for aircraft windows, and, more particularly, relates to an electrically operated window shade assembly having both an opaque shade element and a translucent shade element that can be independently controlled.

BACKGROUND OF THE INVENTION

Conventional window shades for passenger aircraft windows include manually raised/lowered shades. In order for a passenger to operate the shade, it must be on the cabin side of the window, and is therefore exposed to the cabin, as are the tracks in which it moves. This conventional arrangement presents a challenge to crew who have to clean and sanitize the window and shade due to various surfaces. Electrically controlled window shades are also known and used. In general, however, electrically controlled systems tend to be difficult to install and maintain, having fairly complex systems for collecting and extending a shade, such as an accordion/bellows type shade, or a fabric shade. Further, although there are manually operated window shades with two types of shades, many electrically controlled and manually operated window shade assemblies only offer an opaque or single shade element.

Therefore, a need exists to overcome the problems with the prior art as discussed above.

SUMMARY

In accordance with the inventive disclosure, there is provided an electric aircraft window shade system that includes a frame that is configured to mount on an inside of an inner wall of an aircraft at a window opening. The shade system also includes a cassette that is configured to mount in the frame through the window opening. The cassette has a top, a bottom, and first side and a second side, and a shade element that is moveable between a lowered position and a raised position. There is also included a motor to drive the shade element between the raised position and lowered position.

In accordance with a further feature, the motor is disposed in the bottom adjacent the first side, there is a first belt disposed in the first side of the cassette, the shade element coupled to the first belt, and the motor is operable to raise and lower the shade element by driving the first belt.

In accordance with a further feature, there is further provided an axle disposed transversely in the top of the frame, and the first belt is coupled to a first end of the axle. There is a pulley disposed in the bottom adjacent the second side, and a second belt is disposed in the second side of the cassette that connects the pulley to a second end of the axle. The second belt follows the first belt by being driven through the axle.

In accordance with the inventive disclosure, there is provided an electric aircraft window shade system that includes a frame that is configured to mount on an inside of an inner wall of an aircraft at a window opening. There is also a cassette that is configured to mount in the frame. The cassette has a top, a bottom, and first side and a second side, and a motor is disposed in the bottom adjacent the first side. There is an axle disposed transversely in the top of the frame, a pulley disposed in the bottom adjacent the second side, a first belt disposed in the first side connecting the motor to the a first end of the axle, a second belt disposed in the second side connecting the pulley to a second end of the axle, and a shade coupled to the first belt and the second belt. The motor is operable to raise and lower the shade by driving the first belt, which drives the second belt to move correspondingly through the axle.

In accordance with a further feature, there is a bezel that has a lens that is configured to cover the window opening at in inner side of the inner wall of the aircraft.

In accordance with a further feature, there is also an electrical control for operating the motor, where the electrical control is electrically connected to an actuator on a seat.

In accordance with the inventive disclosure, there is provided a retrofit electric window shade system for an aircraft having an inner wall and an outer wall, where the inner wall has a window opening. The retrofit electric window shade system includes a frame that is configured to mount on an of an inner wall of an aircraft at a window opening, and between the inner wall and an outer wall. The retrofit electric window shade system also includes a cassette that is configured to mount in the frame. The cassette includes a shade that is coupled to a first belt at a first side of the cassette and to a second belt at a second side of the cassette. A motor is disposed in the cassette and is operable to drive at least one of the first or second belts to raise and lower the shade. There is also a bezel that has a lens which is configured to cover the window opening at an inner side of the inner wall.

In accordance with a further feature, the cassette includes a top, a bottom, and first side and a second side. The motor is disposed in the bottom adjacent the first side, and an axle is disposed transversely in the top of the frame. There is a pulley disposed in the bottom adjacent the second side. The first belt is connected between the motor and a first end of the axle, and the second belt is coupled between the pulley and a second end of the axle.

In accordance with the inventive disclosure, there is provided an electric aircraft window shade system that includes a frame that is configured to mount on an inside of an inner wall of an aircraft at a window opening. There is also a cassette that is configured to mount in the frame through the window opening. The cassette has a top, a bottom, and first side and a second side. The cassette further has a first shade element that is moveable between a lowered position and a raised position, and a first motor to drive the first shade element between the raised position and lowered position. The cassette also has a second shade element that is moveable between a lowered position and a raised position, and a second motor to drive the second shade element between the raised position and lowered position.

In accordance with a further feature, the first motor is disposed in the bottom of the cassette, adjacent the first side, and the second motor is disposed in the bottom of the cassette adjacent the second side. There is a first belt that is disposed in the first side of the cassette and which is configured to drive the first belt. There is a second belt disposed in the second side of the cassette and which is configured to drive the second belt.

In accordance with a further feature, there is also included an axle disposed transversely in the top of the frame, where the first belt is coupled to a first end of the axle, and the second belt is coupled to a second end of the axle.

In accordance with the inventive disclosure, there is provided an electric aircraft window shade system that includes a frame that is configured to mount on an inside of an inner wall of an aircraft at a window opening. There is also includes a cassette that is configured to mount in the frame. The cassette has a top, a bottom, and first side and a second side. The cassette also includes an axle that is disposed transversely in the top of the frame. The axle has a first end at the first side of the cassette and a second end at the second side of the cassette. The cassette further has a first motor disposed at the bottom adjacent the first side, a first belt routed in the first side between the first motor and the first end of the axle, a second motor disposed at the bottom adjacent the second side, a second belt routed in the second side between the second motor and the second end of the axle, a first shade element coupled to the first belt at a front portion of the first belt, a second shade element coupled to the second belt at a rear portion of the second belt, a motor controller coupled to both the first motor and the second motor. The motor controller is configured to independently control raising and lowering of the first and second shade elements.

In accordance with a further feature, there is also a bezel having a lens that is configured to cover the window opening at in inner side of the inner wall of the aircraft.

In accordance with a further feature, there is also an electrical control for operating the motor controller.

In accordance with a further feature, the first shade element is opaque and positioned in front of the second shade element, and wherein the second shade element is translucent.

In accordance with the inventive disclosure, there is provided a retrofit electric window shade system for an aircraft having an inner wall and an outer wall, where the inner wall has a window opening. The retrofit electric window shade system includes a frame that is configured to mount on an inner wall of an aircraft at a window opening and between the inner wall and an outer wall. The system further includes a cassette that is configured to mount in the frame and has a first shade element that is coupled to a first belt at a first side of the cassette, and it has a second shade element that is coupled to a second belt at a second side of the cassette There is a motor system disposed in the cassette that is operable to independently drive the first belt and the second belt. There is also included a bezel that has an inboard lens that is configured to cover the window opening at an inner side of the inner wall.

In accordance with a further feature, the cassette includes a top, a bottom, and first side and a second side. The motor system includes a first motor disposed in the bottom adjacent the first side and coupled to the first belt, a second motor disposed in the bottom adjacent the second side and coupled to the second belt, wherein the motor system further includes a motor controller that is coupled to each of the first and second motors and that is configured to operate each of the first and second motors independently to raise and lower the first shade element and the second shade element. There is also an axle disposed transversely in the top of the frame that has a first end at the first side of the cassette over which the first belt is routed, and a second end at the second side of the cassette over which the second belt is routed.

In accordance with a further feature, there is also a switch panel coupled to and mounted inboard of the inboard lens so as to be accessible by a passenger.

In accordance with a further feature, the first shade element is an opaque shade element and the second shade element is a translucent shade element.

Although the invention is illustrated and described herein as embodied in an electric aircraft window shade system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 10A and 10B show front and rear perspective view of a subassembly of the window shade assembly of FIG. 9 in which both an opaque and a translucent shade are used.

DETAILED DESCRIPTION

Figure 1:
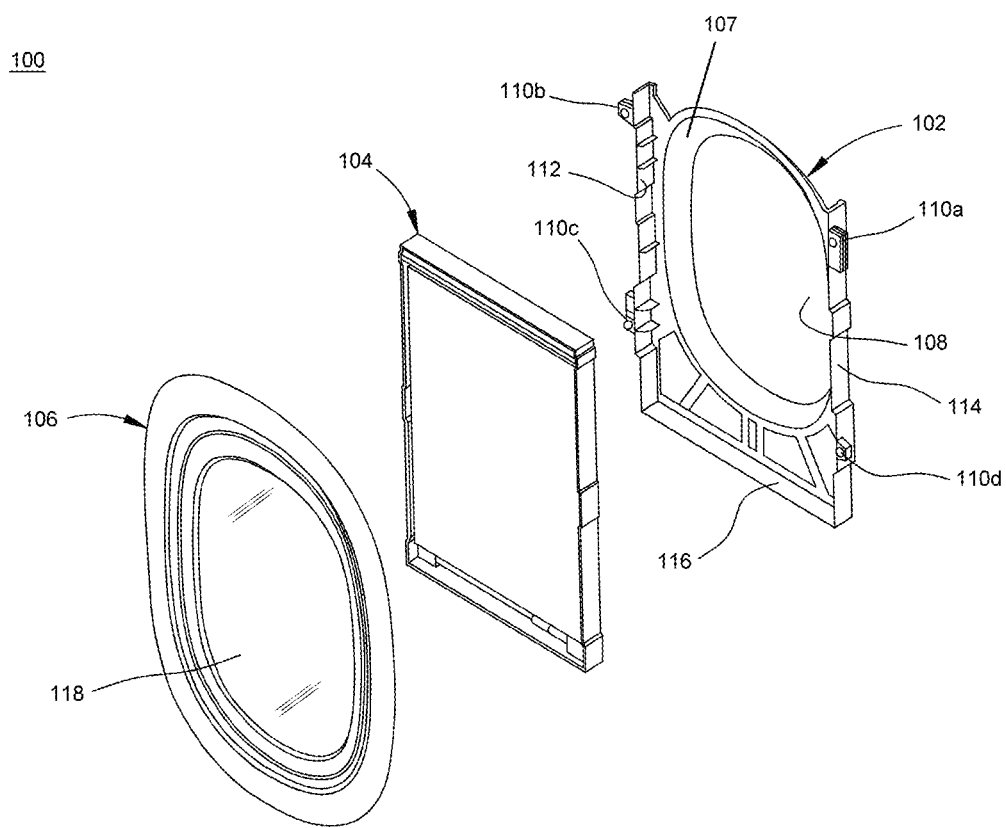
FIG. 1 is an exploded perspective view of an electric window shade assembly for an aircraft in accordance with some embodiments of the disclosure.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 is an exploded perspective view of an electric window shade assembly 100 for an aircraft window in accordance with some embodiments of the disclosure. The inventive window shade system assembly 100 simplifies the installation of the window shade assembly 100 over other known electric window shade systems for aircraft windows and eliminates known issues of window shade systems generally, such as the difficulty in sanitizing the window shade and replacing the window lens. The disclosed window shade system can be installed as a direct retrofit, meaning that no additional mounting elements need to be added, and the disclosed window shade system can be mounted on commonly existing mounts. The system 100 includes a frame 102 that is mounted between the inner and outer walls of the aircraft at a window opening. The frame 102 can be configured to mount on existing mounting features that re presently used to mount conventional window shade assemblies. The frame 102 is configured to hold a cassette 104 that includes a shade that is moved up and down under control of a motor. A lens bezel 106 fits over the window opening on the inside of the aircraft.

The frame 102 includes a mask 107 having opening 108 in the mask 107, and wherein the opening 108 is sized and shaped to match that of an exterior window pane in the outer wall of the aircraft. The frame 102 further has mounting features 110a-110d that mate with corresponding mounting features on the inner wall of the aircraft. The mounting features 110a-110d can be configured to allow an insert/rotate/lock operation as is known, or a more direct mounting operation. The frame 102 is configured to be mounted on the outer side of the inner wall of the aircraft. The frame 102 further includes side walls 112, 114 and bottom wall 116 which support the cassette 104. That is, the cassette 104 is inserted into the frame 102, between the walls 112, 114, and 116. Note that the top of the frame 102 is open (e.g. no wall) to facilitate insertion of the cassette 104 into the frame 102, and to allow the shade to be raised and lowered above and into the frame, respectively. The mounting features 110a-110d can be configured to allow easy retrofit of the frame 102 into existing mounting points on the outer surface of the inner wall of the aircraft. That is, an existing frame for an original or otherwise existing window shade system can be removed from the aircraft, and frame 102 can be mounted directly on the existing mounting features without having to modify, add mounting features, or remove mounting features. Thus, the window shade system 100 can be a retrofit system.

The bezel 106 includes a transparent lens 118 and is mounted on the inside surface of the inner wall of the aircraft, covering the window opening. The bezel can have pop-fit features on its back side that fit into receiving holes in the inner wall of the aircraft the create an interference fit that allows the bezel 106 to be removed by pulling the bezel 106 away from the wall of the aircraft. This allows easy replacement of the lens 118, which can become scratched and hazy over time.

Figure 2:
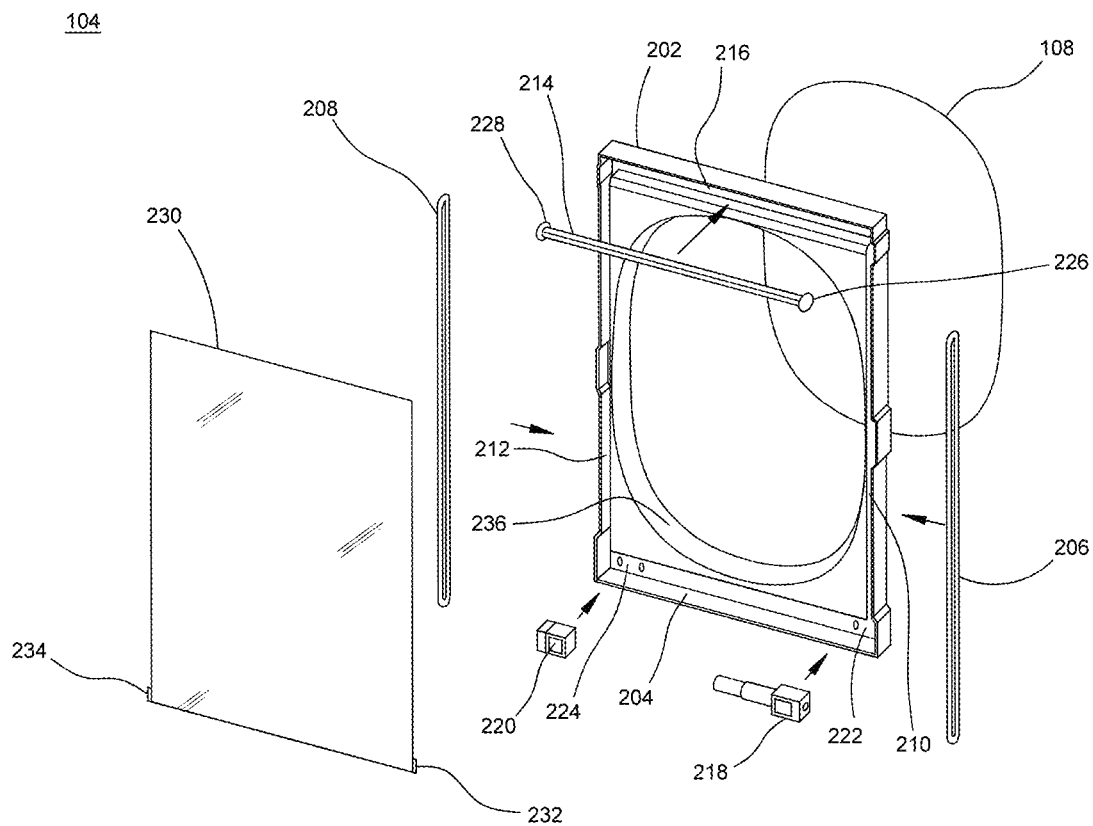
FIG. 2 is an exploded perspective of a cassette including a motor and movable shade in accordance with some embodiments of the disclosure.

FIG. 2 is an exploded perspective of the cassette 104 including a motor 218 and movable shade 230, in accordance with some embodiments of the disclosure. The cassette 104 includes a top 202, bottom 204, and sides 210, 212. The cassette 104 can also have a mask 236 that is sized and shaped in correspondence with the opening 108 in the mask 107 of the frame 102. The mask 236 prevents a person from seeing the components that are disposed between the mask 236 and the sides 202, 204, 210, 212 when the assembly 100 is installed. The motor 218 can be mounted at the bottom 204 of the cassette 104, adjacent the first side 210, and a pulley 220 can be mounted at the bottom 204 adjacent the second side 212. An axle 214 can be mounted at the top 202 transversely in slot 216, having a first end 226 adjacent the first side 210, and a second end 228 adjacent the second side 212. A first belt 206 is disposed along the first side 210 between the first end 226 of the axel and the motor 218. When the motor 218 turns, it drives the first belt 206 to travel around the first end 226 of the axle and the motor 218 (e.g. at a wheel or gear of the motor 218). Thus, when the motor drives the first belt 206, it causes the axle 214 to rotate, thereby driving the second belt 208 to likewise move. The second belt 208 is disposed along the second side 212 of the cassette 104 between the second end 228 of the axle 214 and the pulley 220. In general, the ends 226, 228 of the axle, the motor 218, and the pulley 220 are configured so that the belts 206, 208 move in unison.

The shade 230 can be comprised of a rigid sheet member that is opaque and has a width that is as large, or larger than a width of the lens 118 of the bezel 106. The shade 230 has attachment points 232, 234 at the lower sides of the shade 230 that are attached to the first and second belts 206, 208, respectively. As a result, the shade 230 moves with the belts 206, 208 to be raised or lowered, depending on the direction the belts 206, 208 are moved. Thus, the motor 218 controls raising and lowering the shade 230 by driving the first belt 206, and in turn, the second belt 208 through axle 214. The motor 218 can be controlled to stop rotating based on current draw (e.g. higher current draw when the shade 230 is fully raised or lowered). That is, when the shade 230 is fully lowered, or fully raised, the shade 230 will stop, causing a change in the current level drawn by the motor 218.

The shade 230 can be made of a variety of materials, and can be treated for decorative effect. Material can include, for example, plastic, wood, Formica, paper/cardboard, metal, and so on. In some embodiments the shade 230 can be a laminate structure having an outer layer that faces inward towards the aircraft cabin that serves a decorative purpose. The shade 230 can be painted or printed on the cabin-facing surface (or both surfaces). Material, including fabric, can be applied to the surfaces of the shade.

Figure 3A:
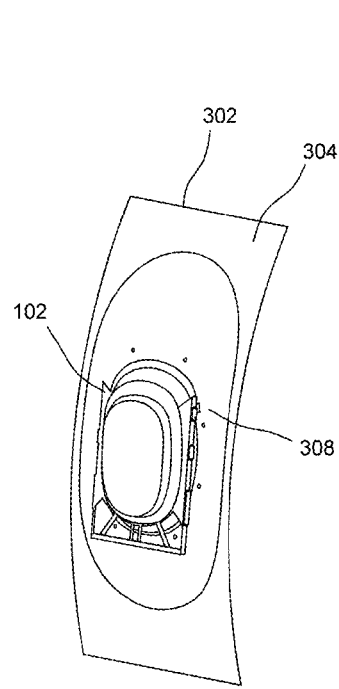
FIGS. 3A-3C show assembly steps for installing the electric window shade system into an aircraft.
Figure 3B:
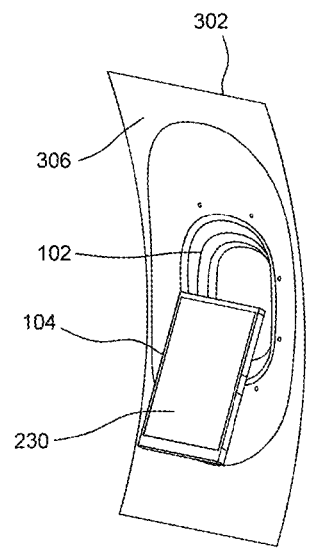
Figure 3C:
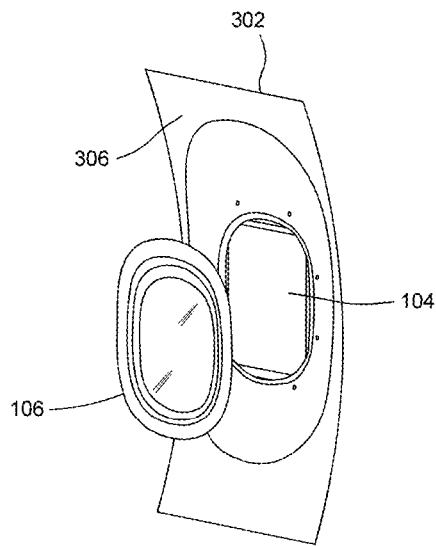

FIGS. 3A-3C show assembly steps for installing the electric window shade system into an aircraft. In FIG. 3A the inner wall 302 of the aircraft is shown from a rear view, meaning from the opposite side of the cabin. The inner wall 302 can be a panel section mounted inside the aircraft. The outer surface 304 of the inner wall 302, which faces outward from the cabin, is in view here. The frame 102 is mounted on attachment features 308 on the outer surface 304 of the inner wall 302 at the window opening. The frame 102 can be mounted by taking the wall panel away from the side of the aircraft, or prior to placing the inner wall 302 panel in place when it is originally installed.

In FIG. 3B, the view is from the inside of the cabin, and the inner side or inner surface 306 is in view. The frame 102 is in place between on the outer surface of the inner wall 302. The cassette 104 can be inserted through the window opening and into the frame 102. The motor 218 can be connected to an electrical connector which allows control of the motor 218. In FIG. 3C, once the cassette 104 is in place in the frame 102, the bezel 106 can be installed on the inner surface 306 of the inner wall 302. Apertures around the window opening can receive studs or similar protrusions on the back of the bezel 106 that provide an interference fit into through the apertures of receivers, but which also allow removal of the bezel 106 by pulling the bezel 106 away from the inner wall 302. The receivers receive the studs therein. This sort of retention is sometimes referred to as "pop fit" because the studs "pop" into the apertures because the studs have a non-uniform diameter along their length, and when pressure is applied, the widest portion of the studs pass through the aperture into the rest of the receiver, and the amount of pressure needed to continue moving decreases as the widest portion of the stud passes though the aperture into the receiver, where the receiver is wider/has a larger diameter than the aperture, resulting in a "pop" action. In an alternative method the bezel 106 can have latching clips which grab the perimeter of the sidewall aperture from the rear (back) of the bezel. Thus, the bezel 106 can be removed and replaced if the lens 118 becomes broken, stained, scratched, etc. without disturbing the other portions of the window shade assembly. Further, the bezel 106 greatly simplifies sanitization over conventional window shade assemblies that expose the shade track to the inside of the cabin, and therefore require cleaning. In comparison the bezel 106 presents a fairly flat surface that can be easily sanitized.

Figure 4A:
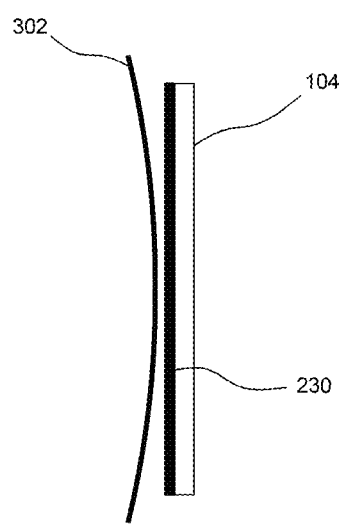
FIGS. 4A-4B show a side view of an installed electric window shade system with the shade lowered and raised.
Figure 4B:
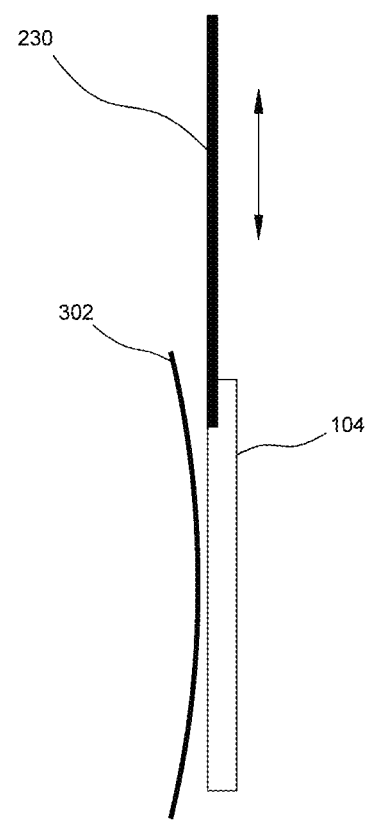

FIGS. 4A-4B show a side view of an installed electric window shade system with the shade lowered and raised. The views here are taken from the side, looking along the wall of the aircraft, and in particular between the inner and outer walls. To simplify the view, only the inner wall 302 and the cassette 104 are shown. The cassette 104 can be assumed to be mounted in the frame 102, which is mounted in the outer surface of the inner wall 302. The shade 230 is mounted on the belts 206, 208 at attachment points 232, 234 (see FIG. 2). As the belts 206, 208 are rotated, the shade 230 moves accordingly. In FIG. 4A, the shade 230 is lowered to the lowered position, and as a result, light will not pass through the window opening. In FIG. 4B, the shade 230 is raised to the raised position. The shade 230 is raised and lowered between the raised and lowered positions as a result of the motor 218 driving the belts 206, 208. Since the shade 230 is a rigid element, it does not need to be rolled, as with prior art fabric shades. Rather, it simply moves into the space above the window opening that is provided for conventional manually raised/lowered shades. Since the cassette 104 can be easily removed from the frame 102, should any component of the cassette 104 become damaged or inoperable, it can easily and quickly be replaced. Further, since the shade 230 is a rigid member, it is easy to provide printing on the inward-facing side of the shade 230 so that airline logos or other graphics can be presented to passengers when the shade 230 is lowered.

Figure 5:
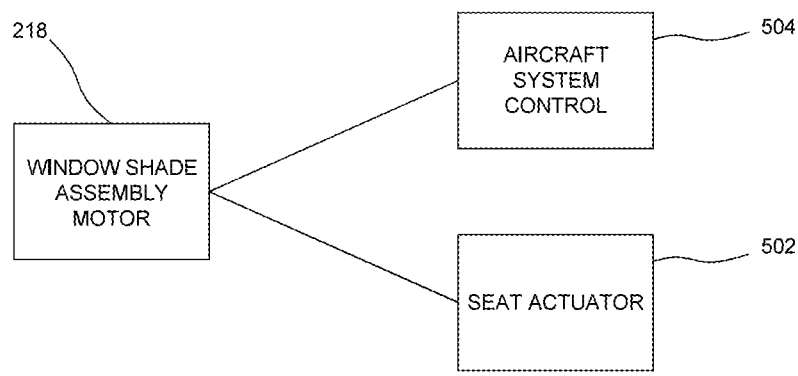
FIG. 5 shows a block schematic diagram of an electrical control arrangement for operating the electric window shade system.

FIG. 5 shows a block schematic diagram 500 of an electrical control arrangement for operating the electric window shade system. In particular, the motor 218 can be connected to an actuator 502 that can be located on a seat next to the window opening, allowing a passenger to raise or lower the shade 230 by pressing or actuating the actuator 502. An administrative override 504 of the passenger-accessible actuator 502 can be used by aircraft staff to raise or lower shades on windows across the aircraft in response to takeoff/landing requirements, or for nighttime travel, as desired.

Figure 6:
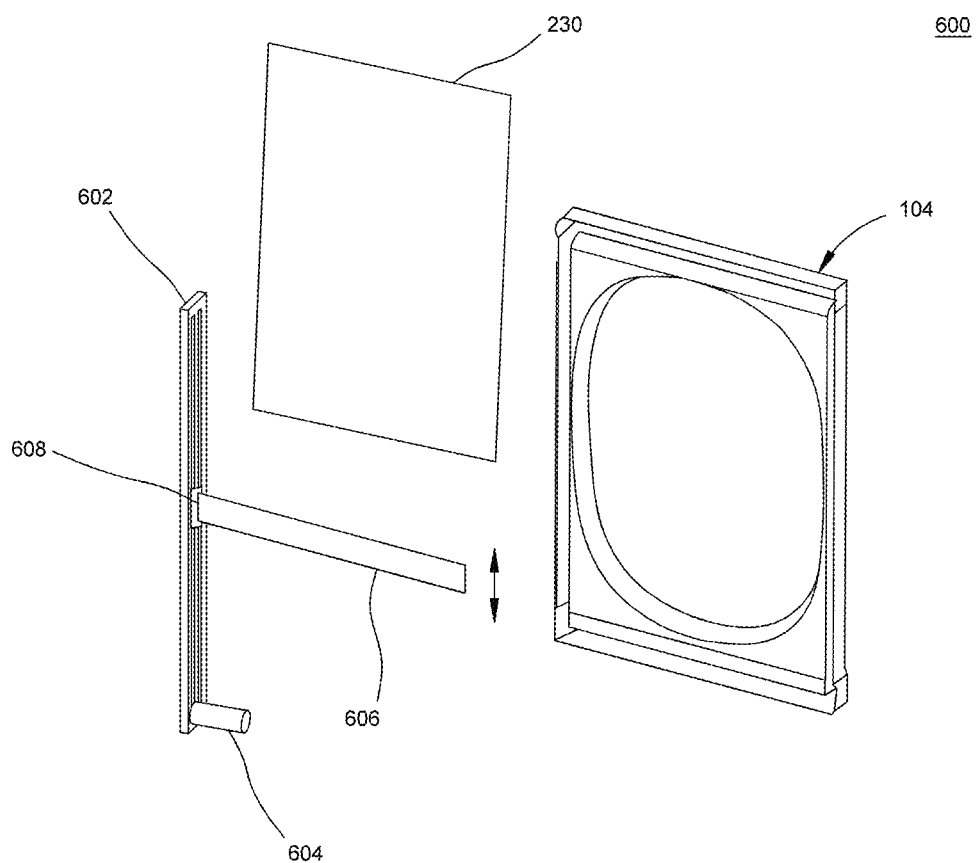
FIG. 6 shows an exploded perspective view of a cassette including a single side drive system for raising and lowering a shade.

FIG. 6 shows an exploded perspective view 600 of a cassette 104 including a single side drive system for raising and lowering a shade. In the preceding embodiments two belts 206, 208 were used where one was driven and the other followed. It is further contemplated that a single side drive arrangement can be used equivalently. As an example, a mounting extension 606 can be driven through an attachment mount 608 that is coupled to a cable or belt system, or a screw drive, in a track 602 that is driven by a motor 604. The motor 604 can be substantially equivalent to motor 218 of the previously described embodiments. The shade 230 can be mounted, at its lower end, on the mounting extension 606, and lifted or lowered by the motor 604 controlling the drive means to raise and lower the mounting extension 606. In some embodiments the mounting extension 606 and attachment mount 608 can be portions of a unitary structure, or they can be separate elements that are joined or coupled together. The track 602 can fit in the side of the cassette 104 with the motor 604 being disposed in the bottom of the cassette 104. This exemplary embodiment therefore eliminates the need for a follower (e.g. belt, cable) on the opposite side of the cassette 104 from that of the track 602.

Figure 7A:
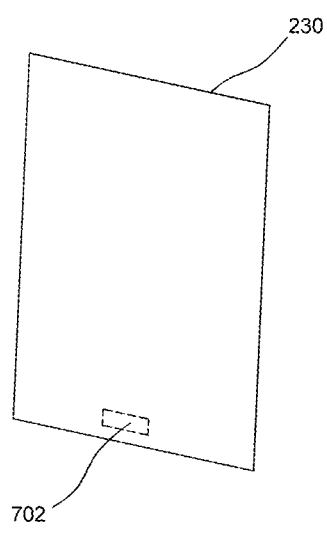
FIGS. 7A-7C show how a magnetic element can be used to raise and lower the shade in the event of a power issue.
Figure 7B:
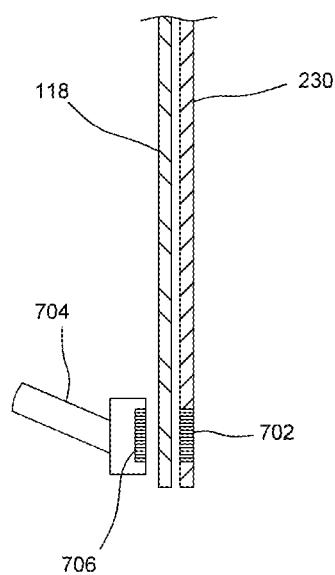
Figure 7C:
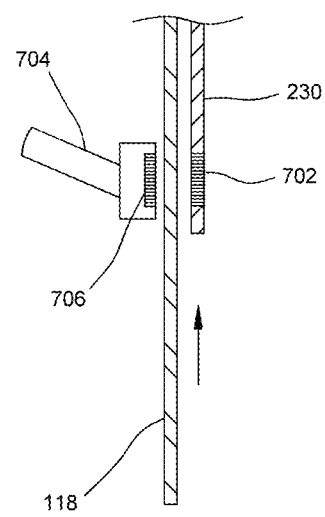

FIGS. 7A-7C show how a magnetic element can be used to raise and lower the shade in the event of a power issue. In the event of loss of power to the motor (e.g. 218 or 604) there may be a need to manually raise or lower the shade 230. It is contemplated that a magnetic element 702 can be disposed in the shade 230. The magnetic element 702 can be hidden from view be being embedded in the shade 230 or covered by a surface treatment on the cabin-facing side of the shade 230. FIGS. B-7C show a side view of the shade 230 deployed in a window opening. As such, the shade 230 will be behind a lens 118. A tool 704 having a magnetic element 706 can be placed near the magnetic element 702 in the shade 230. The magnetic elements 702, 706 can both be magnets, or one can be a ferrous metal member that is attracted to a magnet in the other device. Once the tool 704 is placed proximate to the magnetic element 702, the tool 704 can be raised, sliding along the lens 118. The magnetic attraction between magnetic elements 702, 706 is sufficient to overcome resistance of the shade to move (e.g. gravity and the drive system). The drive system can be designed such that it will offer minimal resistance.

Figure 8:
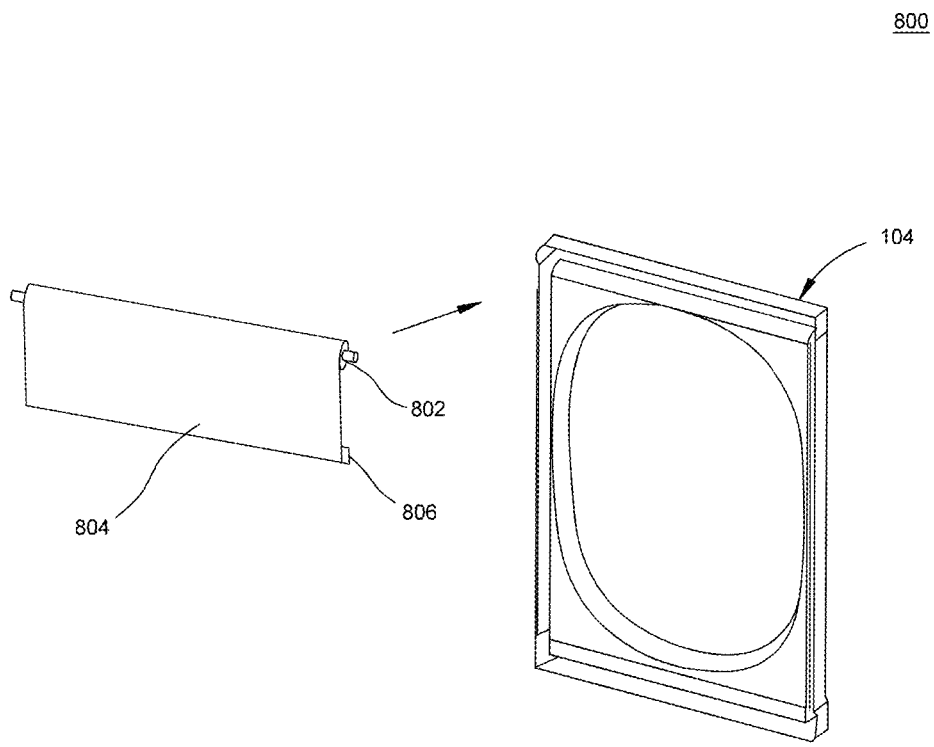
FIG. 8 shows an embodiment of an electrical window shade system using a shade element that is collected on a roller.

FIG. 8 shows an embodiment 800 of an electrical window shade system using a shade element 804 that is collected on a roller. In this exemplary embodiment, rather than using a rigid shade element, a material that can be collected on a roll, such as a fabric, can be used. The roll 802 can be disposed in the top of the cassette 104 transversely. The width of the roll is sufficient to cover the window opening and generally will span nearly the width of the cassette 104. The roll 802 can be unrolled to lower the shade element 804, which will then feed off the roll 802 and travel downward. When the shade element 804 is raised it will be collected on the roll 802. There are several ways to drive the shade element 804, including use of an attachment 806 that can be attached to a belt or cable drive system as previously described, substantially similar to that used to drive the rigid shade 230. In which case the roll 802 can include an internal spring that biases the roll 802 to turn in a direction that causes the roll 802 to collect the shade element 804. The drive system will provide a force that overcomes the bias of the spring in order to lower the shade element 804. Alternatively, the roll 802 can be collected on an axle that is directly driven, and the shade element 804 can contain a weight (e.g. along its lower edge) that tends to pull the shade element 804 downward from the roll 802. In some embodiments both the shade element 804 and the roll 802 can be driven. Further, in some embodiments, the roll 802 can be mounted in the bottom of the cassette 104, and the shade element 804 is driven upwards to raise the shade element and block light through the window.

Figure 9:
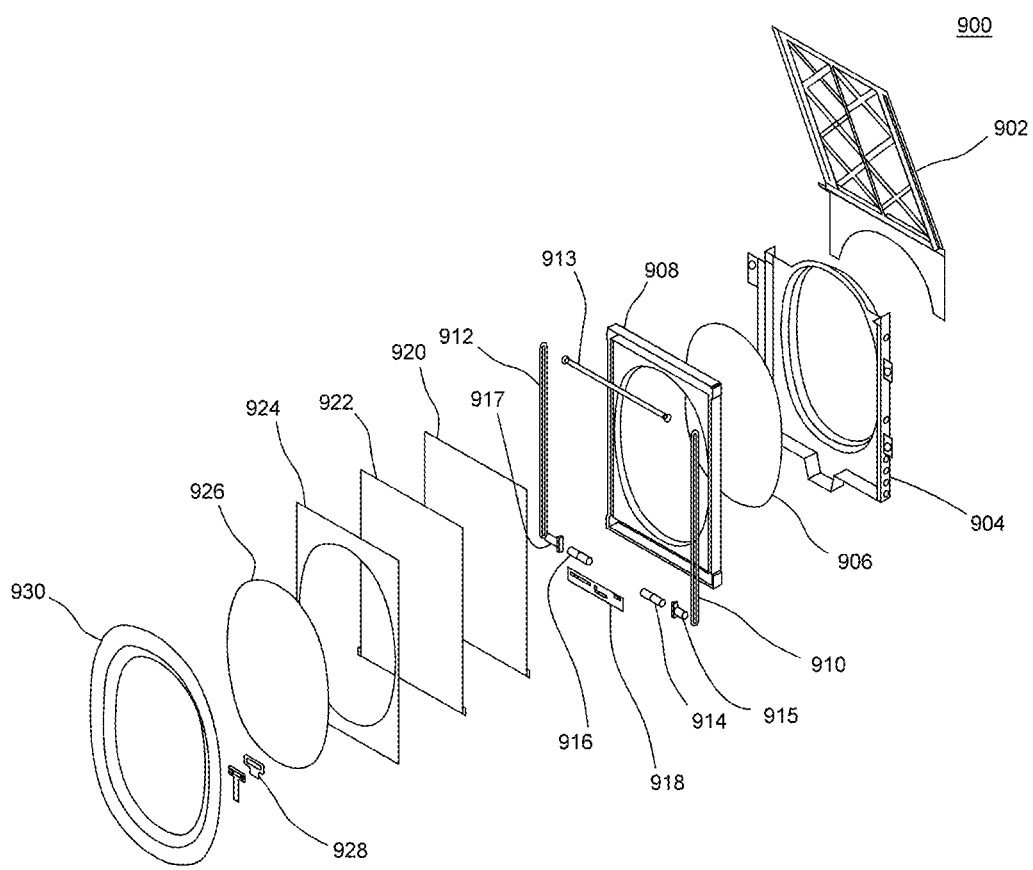
FIG. 9 shows an exploded perspective view of an electric window shade assembly for an aircraft having both opaque and translucent shades, in accordance with some embodiments of the disclosure.

FIG. 9 shows an exploded perspective view of an electric window shade assembly 900 for an aircraft having both opaque and translucent shades, in accordance with some embodiments of the disclosure. The embodiments of FIG. 1-8 relate to an assembly having a single shade (e.g., 230) that is opaque. Window shade assembly 900 includes two shades, one of which is opaque, and one of which is translucent. The two shades can be independently controlled between raised and lowered positions by the aircraft passenger to control the amount of light and the intensity of the light coming through the window. The assembly 900 can be mounted in the aircraft inner wall panel (e.g. 302) in a similar manner as window shade assembly 100.

The assembly 900 can include a blade guide 902 that attaches to the top of a frame 904. The blade guide 920 ensures the shade elements 920, 922, which are also referred to as "blades," follow a prescribed path upon being raised. The angle of the top portion of the blade guide 902 causes the blades 920, 922 to generally follow the curvature of the inner wall of the aircraft. The frame 904 holds the outboard lens 906 as well as the cassette housing 908. The cassette housing 908 holds a subassembly that includes, and which are mounted in the cassette housing, bead cables 910, 912, axle 913, a motor system including motors 914, 916 and motor controller 918, the translucent shade/blade 920, the opaque shade/blade 922, and a mask 924. In some configurations the in-board 926 and outboard lens 906 maybe mounted to the cassette housing 908 instead of the bezel 106 and the frame 102. The cassette housing 908 can be substantially similar to that of cassette 104 shown in FIG. 2, for example. The frame 904 is substantially similar to frame 102 and can be mounted in the same manner as frame 102 on the external surface of the interior wall panel, including as a retrofit into existing mounting features used by a window shade system previously installed in the aircraft that is being replaced by assembly 900. The cassette housing 908 and subassembly can be loaded into the frame 904 substantially as shown in FIGS. 3A-3C. The axle 913 mounts transversely across the top of the cassette housing 908 in a slot sized for the axle 913. The axle 913 includes freely rotating wheels or pulleys at each end of the axle 913, around which the bead cable 910, 912 are routed. First bead cable 910 is mounted on a first side of the cassette housing 908, vertically, and is routed over the first end of the axle 913, and a wheel or pulley attached to first motor 914.

Thus, the first motor 914 and drive the first bead cable 910 to turn in the vertical direction. Mounted on the first bead cable 910 is a first attachment mount 915 that attaches to the translucent shade 920 at the bottom and side of the translucent blade 920. This allow the first motor 914 to raise and lower the translucent shade 920 by turning the first bead cable 910 accordingly. The first bead cable 910 has a front portion and a rear portion, both of which run vertically. The front portion of the bead cable 910 is nearer the interior of the aircraft while the rear portion is nearer the exterior of the aircraft. As the front portion moves upward, the rear portion moves downward, and vice versa. Since the translucent blade 920 is located closer to the exterior of the aircraft, the attachment mount 915 is attached to the rear portion of the bead cable 910. The second bead cable 912 is located on the second side of the cassette housing 908, opposite the first side and first bead cable 910. The second bead cable 912 is substantially similar to the first bead cable 910 and include an attachment mount 917 on the front portion of the second bead cable. The attachment mount 917 attaches to the opaque shade 922 so that the second motor 916 can raise and lower the opaque shade 922. By being mounted on the first portion of the second bead cable 912, the opaque shade 922 and translucent shade 920 can be arranged with the one in front of the other. For example, as shown, the opaque shade 922 can be in front of the translucent shade 920, relative to the interior of the aircraft. The mask 924 provides an ovaline opening that matches the shape of the inboard lens 926 and the opening through the trim ring 930, and masks off (covers) the bead cables 910, 912, motors 914, 916, attachment mounts 915, 917 and axle 913 from view.

The first and second motors 914, 916 are controller and operated by the motor controller 918. The motor controller 918 can operate each of the motors 914, 916 independently, and together the motors 914, 916, and motor controller comprise a motor assembly. Accordingly, the motor controller 918 is configured to raise/lower both the opaque shade 922 and translucent shade 920 together, or independently raise/lower them. A switch panel 928 is mounted in front of the inboard lens 926, such as at the bottom of the inboard lens 926, and is electrically coupled to the motor controller 918 to allow a user to control the raising and lowering of each of the shades 920, 928. In one mode of operation, where both shades 920, 922 are fully lowered, the motor 918 is configured to completely raise the opaque shade 922 before raising the translucent shade 920. The user can control how much the opaque shade 922 is raised by holding a switch button on the switch panel 928, for example. Alternatively, the motor controller 918 can be configured to commence raising the shades 922, 920 (in order), by pressing an "up" button once, and then stop raising upon the "up" button being pressed again, or when both shades 920, 922 are fully raised. Likewise, with both of the shades 920, 922 fully raised, pressing a "down" button can cause the motor to commence lowering the translucent shade, and then the opaque shade, unless the user again presses the "down" button or until the opaque shade is fully lowered. This allows the passenger to select the level of light block they desire. They have both shades 920, 922 fully lowered, the opaque shade 922 partially raised/lowered, or fully raised. With the opaque shade 922 fully raised, then the passenger can control the position of the translucent shade 920 to be fully lowered, partially raised/lowered, or fully raised.

FIGS. 10A and 10B show front and rear perspective views, respectively of a subassembly of the window shade assembly of FIG. 9 in which both an opaque and a translucent shade are used. The subassembly includes the cassette housing 908 in which the translucent shade 920 and opaque shade 922 are disposed, along with the other elements that are not in view, such as the bead cables 910, 921, motors 914, 916, axle 913, and motor controller 918. In FIG. 10A the mask 924 is also seen. As shown here, both the opaque shade 922 and the translucent shade 920 are partially raised/lowered, with the opaque shade 922 being raised more than the translucent shade 920. As a result, the lower portion 1002 of the window has no light blocking or light reducing element present. The translucent shade 920 can be a tinted transparent shade element, or it can diffuse light in a why that allows light to pass without being transparent. In alternate construction the position of the opaque shade 922 and the translucent shade 920 may be reversed such that the translucent shade 920 is located closer to the inboard position and the opaque shade 922 is located behind it towards the outboard position.

Furthermore, when both a translucent shade 920 and an opaque shade 922 are present it may be desired to incorporate a magnetic element 702 on both shades. In such configuration it is contemplated that a magnetic element 702 can be disposed in each the shade 920 and 922. The magnetic element 702 can be hidden from view be being embedded in the shades 920 and 922 or covered by a surface treatment on the cabin-facing side of the shade 920 or 922. As such both the translucent shade 920 and the opaque shade 922 will respond independently or simultaneously to tool 704 as described previously.

Figures 11A, 11B:
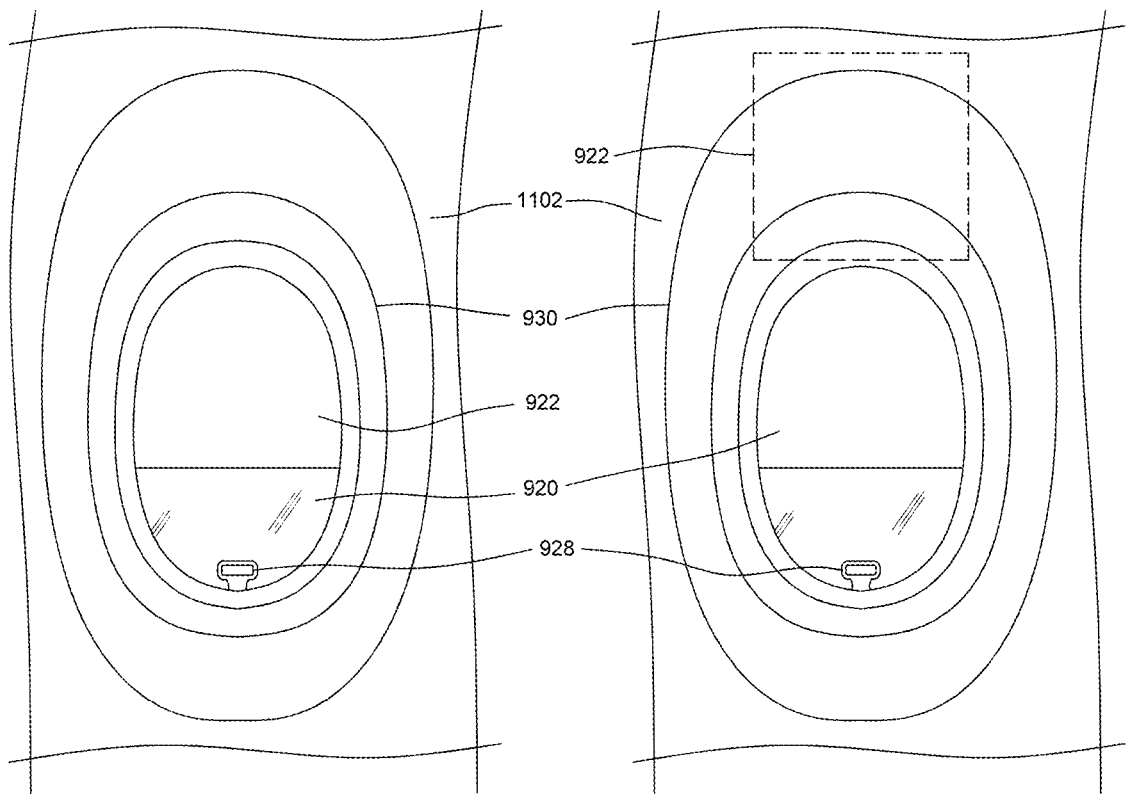
FIGS. 11A and 11B show a front view of an installed window shade assembly in an aircraft wall panel, and illustrates operation of the opaque and translucent shades.

FIGS. 11A and 11B show a front view of an installed window shade assembly in an aircraft wall pane 1102, and illustrates operation of the opaque and translucent shades. The switch pane 928 is accessible by the passenger/user to raise and lower the shades 920, 922. In FIG. 11A the opaque shade 922 is partially raised, exposing the translucent shade 920 to the passenger. In FIG. 922, the opaque shade 922 is fully raised, and out of view, as indicated by the broken line. Further in FIG. 11B, the translucent shade 920 is partially raised, leaving the lower portion of the window with no covering, as may be the choice by the passenger.

It is further contemplated that the switch panel 928 can be located on a passenger seat adjacent the window, or in addition to another similar switch control located on the passenger seat. Further, it is contemplated that the motor control 918 can be further coupled to the central control that allows aircraft personnel to raise/lower all shades on all window of the aircraft at the same time, as in FIG. 5.

An electric window shade system for aircraft windows has been disclosed that greatly simplifies the installation, replacement, and maintenance of the major portions of the shade assembly. In particular, the system includes a frame mounted between the inner and outer walls of the aircraft that receives and holds a cassette. The cassette includes both an opaque shade and a translucent shade, and a motor a motor for each so that they can be raised and lowered by their respective motor through a belt drive arrangement. The shades can each be a rigid member that simply moves up and down, using the space above the window opening provided for manually operated window shades. A bezel having a lens fits over the window opening at the inner wall, which prevents passengers from touching the shade, and presents a surface that is easy to clean. The arrangement of the bezel, cassette, and frame allow for the bezel and cassette to be easily removed and replaced.

What is claimed is:

1. An electric aircraft window shade system, comprising:
    a frame configured to mount on an outer surface at an outer side of an inner wall of an aircraft at a window opening, the inner wall having an inner side opposite the outer side, wherein no portion of the frame is positioned on the inner side of the inner wall; and
    a cassette configured to mount in the frame by being inserted through the window opening into the frame, the cassette having a top, a bottom, a first side and a second side, the cassette further having a shade element that is moveable between a lowered position and a raised position, and a motor to drive the shade element between the raised position and lowered position.

2. The electric aircraft window shade system of claim 1, further comprising:
 the motor being disposed in the bottom of the cassette adjacent the first side;
 a first belt disposed in the first side of the cassette;
 the shade element coupled to the first belt; and
 wherein the motor is operable to raise and lower the shade element by driving the first belt.

3. The electric aircraft window shade system of claim 2, further comprising
 an axle disposed transversely in the top of the frame, the first belt coupled to a first end of the axle;
 a pulley disposed in the bottom adjacent the second side;
 a second belt disposed in the second side connecting the pulley to a second end of the axle; and
 wherein the second belt follows the first belt by being driven through the axle.

4. An electric aircraft window shade system, comprising:
 a frame configured to mount on an outer side of an inner wall of an aircraft at a window opening in the inner wall, the inner wall having an inner side opposite the outer side, wherein no portion of the frame is positioned on the inner side of the inner wall; and
 a cassette configured to mount in the frame by being inserted through the window opening into the frame, the cassette having a top, a bottom, a first side and a second side, the cassette further having a motor disposed in the bottom adjacent the first side, an axle disposed transversely in the top of the frame, a pulley disposed in the bottom adjacent the second side, a first belt disposed in the first side connecting the motor to a first end of the axle, a second belt disposed in the second side connecting the pulley to a second end of the axle, and a shade coupled to the first belt and the second belt, and wherein the motor is operable to raise and lower the shade by driving the first belt, which drives the second belt to move correspondingly through the axle.

5. The electric aircraft window shade system of claim 4, further comprising a bezel having a lens that is configured to cover the window opening at an inner side of the inner wall of the aircraft.

6. The electric aircraft window shade system of claim 4, further comprising an electrical control for operating the motor, the electrical control being electrically connected to an actuator on a seat.

7. A retrofit electric window shade system for an aircraft having an inner wall and an outer wall, the inner wall having a window opening, the retrofit electric window shade system comprising:
 a frame configured to mount on an outer side of the inner wall of the aircraft at the window opening and between the inner wall and an outer wall, the inner wall having an inner side opposite the outer side, wherein no portion of the frame is positioned on the inner side of the inner wall; and
 a cassette configured to mount in the frame by being inserted through the window opening into the frame and having a shade that is coupled to a first belt at a first side of the cassette and to a second belt at a second side of the cassette, a motor disposed in the cassette operable to drive at least one of the first or second belts to raise and lower the shade; and
 a bezel having a lens that is configured to cover the window opening at an inner side of the inner wall.

8. The retrofit electric window shade system of claim 7, wherein the cassette includes
 a top, a bottom, a first side and a second side;
 the motor disposed in the bottom adjacent the first side;
 an axle disposed transversely in the top of the frame,
 a pulley disposed in the bottom adjacent the second side,
 the first belt connected between the motor and a first end of the axle; and
 the second belt coupled between the pulley and a second end of the axle.

9. An electric aircraft window shade system, comprising:
 a frame configured to mount on an outer side of an inner wall of an aircraft at a window opening; and
 a cassette configured to mount in the frame by being inserted through the window opening into the frame such that the cassette is entirely on the outer side of the inner wall, the cassette having a top, a bottom, a first side and a second side, the cassette further having a first shade element that is moveable between a lowered position and a raised position, and a first motor to drive the first shade element between the raised position and lowered position, and a second shade element that is moveable between a lowered position and a raised position, and a second motor to drive the second shade element between the raised position and lowered position.

10. The electric aircraft window shade system of claim 9, further comprising:
 the first motor disposed in the bottom adjacent the first side, the second motor disposed in the bottom adjacent the second side; and
 a first belt disposed in the first side of the cassette and configured to drive the first belt, a second belt disposed in the second side of the cassette and configured to drive the second belt.

11. The electric aircraft window shade system of claim 10, further comprising an axle disposed transversely in the top of the frame, the first belt coupled to a first end of the axle, the second belt coupled to a second end of the axle.

12. An electric aircraft window shade system, comprising:
 a frame configured to mount on an outer side of an inner wall of an aircraft at a window opening, the inner wall having an inner side that is opposite the outer side of the inner wall, wherein no portion of the frame is positioned on the inner side of the inner wall; and
 a cassette configured to mount in the frame by being inserted through the window opening into the frame, the cassette having a top, a bottom, a first side and a second side, an axle disposed transversely in the top of the frame having a first end at the first side of the cassette and a second end at the second side of the cassette, the cassette further having a first motor disposed at the bottom adjacent the first side, a first belt routed in the first side between the first motor and the first end of the axle, a second motor disposed at the bottom adjacent the second side, a second belt routed in the second side between the second motor and the second end of the axle, a first shade element coupled to the first belt at a front portion of the first belt, a second shade element coupled to the second belt at a rear portion of the second belt, a motor controller coupled to both the first motor and the second motor, and wherein the motor controller is configured to independently control raising and lowering of the first and second shade elements.

13. The electric aircraft window shade system of claim 12, further comprising a bezel having a lens that is configured to cover the window opening at an inner side of the inner wall of the aircraft.

14. The electric aircraft window shade system of claim 12, further comprising an electrical control for operating the motor controller.

15. The electric aircraft window shade system of claim 12, wherein the first shade element is opaque and positioned in front of the second shade element relative to an interior of the aircraft, and wherein the second shade element is translucent.

16. A retrofit electric window shade system for an aircraft having an inner wall and an outer wall, the inner wall having a window opening, the retrofit electric window shade system comprising:

a frame configured to mount on an outer side of the inner wall of the aircraft at the window opening and between the inner wall and the outer wall, the inner wall having an inner side that is opposite the outer side of the inner wall, wherein no portion of the frame is positioned on the inner side of the inner wall; and a cassette configured to mount in the frame by being inserted through the window opening into the frame such that the entire cassette is on the outer side of the inner wall, and having a first shade element that is coupled to a first belt at a first side of the cassette, and having a second shade element that is coupled to a second belt at a second side of the cassette, a motor system disposed in the cassette operable to independently drive the first belt and the second belt; and a bezel having an inboard lens that is configured to cover the window opening at an inner side of the inner wall.

17. The retrofit electric window shade system of claim 16, wherein the cassette includes a top, a bottom, a first side and a second side;

the motor system including a first motor disposed in the bottom adjacent the first side and coupled to the first belt, a second motor disposed in the bottom adjacent the second side and coupled to the second belt, the motor system further including a motor controller that is coupled to each of the first and second motors and configured to operate each of the first and second motors independently to raise and lower the first shade element and the second shade element; and an axle disposed transversely in the top of the frame having a first end at the first side of the cassette over which the first belt is routed, and a second end at the second side of the cassette over which the second belt is routed.

18. The retrofit electric window shade system of claim 16, further comprising a switch panel coupled to and mounted inboard of the inboard lens so as to be accessible by a passenger.

19. The retrofit electric window shade system of claim 16, wherein the first shade element is an opaque shade element and the second shade element is a translucent shade element, wherein the opaque shade element is in front of the translucent shade element relative to an interior of the aircraft.

20. The retrofit electric window shade system of claim 16, wherein the frame is configured to mount onto existing mounting features used by another window shade system frame being replaced by the frame.

\* \* \* \* \*